Patented Oct. 5, 1948

2,450,513

UNITED STATES PATENT OFFICE 2,450,513

SOREL CEMENT

Dean S. Hubbell, Sharpsburg, Pa., assignor to H. H. Robertson Company, Pittsburgh, Pa., a corporation of Pennsylvania No Drawing. Application June 29, 1945, Serial No. 602,398

3 Claims. (Cl. 106—106)

This invention relates to a cement and more particularly to an oxychloride cement.

The object of the invention is to improve the copper bearing oxychloride cements forming the subject matter of United States patents to Hubbell Nos. 2,058,984; 2,058,985; 2,058,986; and 2,058,987, particularly with respect to the form in which the copper is incorporated in the oxychloride cement whereby there is imparted to the cement improved water resistance and stability as well as other superior characteristics, as will be hereinafter described.

With this general object in view, and such others as may hereinafter appear, the invention consists in the improved oxychloride cement hereinafter described and particularly defined in the claims at the end of this specification.

As set forth in the United States patents to Hubbell above referred to, the water resistance, stability, and general commercial utility of oxychloride cements, and particularly of magnesium oxychloride cements, have been greatly improved and increased by the incorporation into the oxychloride cements of minor proportions of finely divided metallic copper or finely divided cuprous oxide. Prior to the invention of the superior copper bearing oxychloride cements forming the subject matter of my patents above referred to, it was generally recognized that magnesia cements were disqualified from many industrial and commercial uses because of the extent to which their cementing constituent dissolved in water. The incorporation of copper either in the form of finely divided metallic copper or in the form of cuprous oxide in a minor proportion, as for example from 3 to 10%, proved to be substantially beneficial to the cement and to increase its water resistance and strength.

When the minor proportion of finely divided metallic copper or cuprous oxide is added to the magnesia cement and the latter is permitted to harden, the cement gradually assumes a characteristic bluish-green color during the hardening process and the increased strength and water resistance of the cement develops as this bluish-green characteristic color is developed. While the exact mechanism of the reactions which actually take place between the finely divided copper or cuprous oxide and the constituents of the magnesia cement during the hardening process are not well understood, nevertheless experience has demonstrated that the cements are improved when the metallic copper and cuprous oxide is incorporated in the form of an extremely fine powder having particle sizes of a few microns.

The reactivity of the metallic copper and cuprous oxide in this extremely finely divided condition facilitates the reaction thereof with the ingredients of the cement to form insoluble copper compounds. The reaction product occupies more space than the original copper particle or original cuprous oxide particle, and as it forms it apparently swells effectively filling capillaries and interstices in the cement with the insoluble copper compounds. It will be apparent, therefore, that the rate of corrosion or rate of the reaction of the copper or cuprous oxide with the cement plays an important part in improving the water resistance and strength of the oxychloride cement. In addition, the commercial forms of finely divided metallic copper which have been heretofore available have lacked stability in the air and all tend to oxidize to the black or cupric state. This is particularly true when humid atmospheric conditions are encountered.

I have discovered that a cupreous material which may be used with advantage in the production of a copper bearing magnesium oxychloride cement, in accordance with the disclosures of my United States Patents Nos. 2,058,984; 2,058,985; 2,058,986; and 2,058,987 may be produced utilizing cement copper or copper precipitate as a basic or raw material for the production of such cupreous material, and in accordance with the invention such cement copper or copper precipitate is subjected to a special treatment by which the particles are reduced in size to the order of a few microns while producing a thin protective film of cuprous oxide upon the individual copper particles. This cuprous product is characterized by a high degree of stability in the air and at the same time the copper is present therein in a form which has been found to be not only stable in the air but highly reactive when exposed to conditions such as are present in a magnesium or other oxychloride cement during the hardening thereof.

Cement copper or copper precipitate as produced at the mines or refineries comprises a brownish red sludge, wherein the copper is present in the form of a peculiar crystalline form of copper particle dendritic in nature and capable of being easily crushed when subjected to impact as by passing through one of several types of hammermills, jet pulverizers and ball mills. The commercial cement and precipitated copper in the condition obtainable from the refineries contains impurities including compounds of iron, aluminum and silica and which for the purposes of the present invention may be regarded merely as inert diluents. Along with such impurities commercial cement copper contains cuprous oxide in varying amounts from a small amount up to 40% and in some instances more, depending upon the method employed in precipitating the material at the mines. For example, cement copper obtained from Western mines has averaged about 18% cuprous oxide, whereas a cement copper obtained from Eastern sources averaged in the neighborhood of 40 to 42% of cuprous oxide.

When such copper sludge was air dried according to prior practice the product blackened, resulting in a cupreous product having a high cupric oxide content and this product could not be used for the production of the improved oxychloride cements forming the subject matter of my patents above referred to. Freshly precipitated copper has also been dried in a reducing atmosphere to produce a bright oxide-free cupreous powder, but this powder is relatively unstable in the air, tends to blacken quickly, and has proved to be unsatisfactory in commercial practice when the attempt has been made to use it in the production of such cements.

In order to produce the present stable in the air cupreous pigment the cement or precipitated copper sludge preferably in its unrefined condition and in any event without being subjected to chemical treatment which would effect the removal of its cuprous oxide content, is shipped from the refinery in a damp state and in such a manner as to minimize further oxidation of the copper and so that the cement or precipitated copper when received is substantially free from cupric oxide. This may be accomplished in practice by shipping the damp material in a tight container or by shipping it in a bulk mass in which the moisture content is so high that all interstices between the particles are filled with water and the air is consequently excluded. Experience has shown that a minimum amount of water of from 22 to 27% will accomplish this result. The damp and incompletely oxidized cement copper or copper precipitate as thus received, may be subjected to further processing as follows: The wet sludge is subjected to treatment to remove the water therefrom as rapidly as possible. Heretofore commercial cement or precipitated coppers have been regarded as unstable. Damp copper oxidized with great rapidity when exposed to the air, especially when heated and oftentimes at a rate approaching spontaneous combustion.

Accordingly the removal of moisture is preferably effected as rapidly as possible in order to shorten the interval during which the drying copper particles are exposed to severe oxidizing conditions. This may be accomplished in any of several types of drying equipment in which moisture is rapidly evaporated and swept away from relatively thin layers of the powder at temperatures not greatly in excess of the boiling point of water. For example direct or indirect fired rotary driers; and heated surfaces over which relatively thin layers of the powder are moved; conveyors that move the powder in relatively thin layers while it is heated by radiation or by hot gases have been found satisfactory.

Satisfactory results have also been obtained by subjecting the material to drying during the crushing operation providing the moisture content is not excessively high, employing hot products of combustion as the circulating medium in a mill of the type of the "Raymond Imp" mill, additional air being introduced into the mill and circulated during the operation.

In practice it has been found to be desirable to accomplish the drying in two steps, one immediately following the other. The damp powder is first given a preliminary drying down to approximately 10% of water by one of the driers mentioned above, then transferred immediately to the impact or crushing mill where the remainder of the moisture is most completely removed, preferably to 0.2–0.4%, during grinding by the hot gaseous circulating medium. Dust in the primary drier is avoided by discharging the product at a moisture content that is above the point where dust is produced. This partially dried powder must be immediately transferred to the impact mill and given its final drying to remove the moisture as completely as possible, as even one or two per cent of moisture causes oxidation of the copper to the cupric state, resulting in a blackened and commercially unsatisfactory product.

The next step in the process of producing the present pigment comprises subjecting to pulverization the cement copper with its copper content comprising friable copper dendrites and a varying but substantial content of cuprous oxide and containing very little if any cupric oxide. The pulverization may be accomplished by passing the material through an impaction mill, such as hammermill or a jet pulverizer, and through which air is preferably circulated along with hot products of combustion. The pulverizing action upon the cement copper not only crushes it to extreme fineness, wherein the particle size is reduced to a few microns but also produces the most unexpected result of imparting to the material the ability to resist further oxidation when exposed to atmospheric conditions. In order to discover the underlying reasons for the high reactivity of the present finely divided cupreous material and its remarkable air stability, extended research was carried on including chemical analysis of the cupreous powder product as above described. The results of such analyses disclosed that the cuprous oxide content was not appreciably increased during the passage of the material through the mill and further that additional passes through the mill did not effect any further oxidation of the copper to cuprous oxide. X-ray studies and also inspection of polished surfaces cut through the particles and viewed with reflected light at 1000 diameters demonstrated that the cupreous powder comprises copper particles having thin surface films of cuprous oxide thereon, which appear to serve as protective films therefor. Among the film covered copper particle occasional small grains of oxidized copper ($Cu_2O$) were disclosed which obviously afforded no protection for the copper particles. Examination of cupreous products produced from cement copper from different sources and which contained widely varying amounts of cuprous oxide, as for example variations from 18 to 42% cuprous oxide, demonstrated that the surface film was of substantially the same thickness irrespective of the original cuprous oxide content. The original granular form of the cuprous oxide in the unprocessed cement copper indicates its unprotective nature and explains the reason why the unprocessed cement copper readily oxidizes to cupric oxide.

My research has indicated that the novel air stable and highly reactive cupreous powder may be produced from cement or precipitated copper having a widely varying cuprous oxide content, and the lower limit of cuprous oxide content required may be stated as being sufficient to be discernible by metallographic methods and to be identified by X-ray diffraction. When at least such an amount of cuprous oxide is present it has been found that the present process results in the production of a cuprous powder wherein the fine copper particles are coated with a thin protective film of cuprous oxide.

In explanation of the production of the air stable and highly reactive cuprous powder as deduced from the foregoing evidence, it will be observed that, as above stated, the unrefined cement copper, constituting the raw material which is fed to the mill, contains metallic copper particles of varying sizes in the form of friable copper dendrites and that the cuprous oxide, which may vary widely in amount as above set forth, exists in the form of solid masses or grains of varying size and which are distributed throughout the cement copper. Presumably some cuprous oxide exists on the surface of the copper particles but probably in the form of a loosely adhering scale or excrescence and not in the form of continuous film covering the copper particles. When this cement copper is subjected to the hammering action of the mill, these friable particles are broken apart and the operation is continued until the average particle diameter of the ground or crushed product is a few microns, and in commercial practice a fineness of the order of two microns is easily obtained. The new metallic surfaces produced by the crushing and sub-division of the particles in the mill are produced at a time when the particle is hot as a result of the impact and these surfaces are swept by an atmosphere that is at least somewhat oxidizing in nature. As a result, it is believed that a cuprous oxide film is formed on the surfaces of the individual particle and this fact is borne out by metallographic studies. Furthermore, experience justifies the belief that the cuprous oxide film produced under these conditions is continuous and serves to protect the metallic copper particles from further oxidation. For example, it is known that high temperature films of oxide on iron are more protective against further oxidation than low temperature films and furthermore that films put on by shot peening are quite resistant to further oxidation. Presumably this peening does several things—it heats the surface momentarily due to the impact and it also does some work on the film produced, probably spreading it around, compacting it and closing up the discontinuities. The action that the cuprous particles receive can be pictured as very similar to this peening for the hammermill or jet pulverizer (Micronizer) accomplish much of their result by causing particles to strike each other. Thus the particles peen each other, producing on each other a film that is continuous and serves as a barrier to further oxidation. This protective film is very thin, as shown by the metallographs, but there are many examples of extremely thin protective films on metal surfaces, i. e. aluminum. Here, then, is an explanation of the fact that while the copper powder is remarkably stable in air, it is highly reactive in certain solutions. In these solutions the thin protective coating is removed and an enormous metallic surface is exposed. The solution rate of this exposed particle may be accelerated by the fact that metallic copper and cuprous oxide lie in close proximity and thus contribute to galvanic corrosion by creating a large number of small couples.

In accordance with the present invention the superior cuprous powder produced as above described may be used with advantage instead of the metallic copper or the cuprous oxide in producing an improved cement in accordance with the teachings of my patents above referred to. Satisfactory results have been secured utilizing varying amounts of the cuprous powder and preferably from 3 to 10% by weight and this may be incorporated into the cement in the form of a finely divided powder, and when such a cement is used it will be observed that during the hardening process the bluish-green characteristic color develops much more rapidly as a result of the more rapid solution of the copper and of the formation of soluble copper salts and of their reaction with the cement. This increased rate of reaction is proportionate to the leach rate of the copper in the salt solutions of the cement and experience has demonstrated that the improved cuprous powder produced as above described possesses a much higher leach rate than either pure metallic copper or cuprous oxide, and as a result its reaction with the other ingredients proceeds much more rapidly and the resulting product possesses more stability, strength and water resistance than the cementitious products produced in accordance with my patents above referred to, so that I regard my present cement as a distinct improvement thereover. Undoubtedly the presence of the cuprous oxide film and the cuprous oxide content in immediate proximity to the copper particles sets up extensive galvanic corrosion because of the vast number of small cuprous oxide-copper couples which are formed.

Magnesium oxychloride cements are usually supplied to the user in the form of a mixture or aggregate of the dry ingredients and this dry mix is gaged at the time of use with a solution of magnesium chloride. Occasionally magnesium chloride in dry form is included in the dry mix so that it is necessary only to add water when gaging the mix. As used throughout the claims, the term "dry mixture of magnesia and aggregate" is intended to define the dry ingredients of the magnesium oxychloride cement in a condition ready to be gaged either by a solution of magnesium chloride or by water.

Having thus described the invention, what is claimed is:

1. A cementitious material possessing superior water resistance and strength comprising a magnesium oxychloride cement containing a finely divided cuprous powder, the major portion of whose particles are of a size of the order of a few microns, said cuprous powder comprising essentially metallic copper particles having protective cuprous oxide films thereon and a substantial proportion of cuprous oxide, said cuprous powder being present in an amount substantially less than the amount of the cement.

2. A cementitious material possessing superior water resistance and strength comprising a cement of the sorel type containing a finely divided cuprous powder, the major portion of whose particles are of a size of the order of a few microns, said cuprous powder comprising essentially metallic copper particles having protective cuprous oxide films thereon and a substantial proportion of cuprous oxide, said cuprous powder being present in an amount substantially less than the amount of the cement.

3. An air stable cementitious material capable of being stored without deterioration for relatively long periods of time consisting of a dry mixture of magnesia and aggregate adapted when gaged and set to produce a magnesium oxychloride cement having superior water resistance and strength, said dry mix containing a finely divided cupreous powder, the major portion of whose particles are of a size of the order of a few microns, said cupreous powder comprising essentially metallic copper particles having protective cuprous oxide films thereon and a substantial proportion of cuprous oxide, said cupreous powder being present in an amount substantially less than the amount of the dry mixture of magnesia and aggregate.

DEAN S. HUBBELL.

REFERENCES CITED

The following references are of record in the file of this patent:

UNITED STATES PATENTS

| Number | Name | Date |
|---|---|---|
| 2,058,984 | Hubbell | Oct. 27, 1936 |
| 2,058,987 | Hubbell | Oct. 27, 1936 |
| 2,218,679 | Hubbell | Oct. 22, 1940 |